US006693773B1

(12) United States Patent
Sassine

(10) Patent No.: US 6,693,773 B1
(45) Date of Patent: Feb. 17, 2004

(54) DISK DRIVE HAVING A VERTICALLY ADJUSTABLE RAMP LOAD

(75) Inventor: Joseph H. Sassine, Lakeville, MN (US)

(73) Assignee: Western Digital Technologies, Inc., Lake Forest, CA (US)

( * ) Notice: Subject to any disclaimer, the term of this patent is extended or adjusted under 35 U.S.C. 154(b) by 171 days.

(21) Appl. No.: 09/823,737

(22) Filed: Mar. 30, 2001

(51) Int. Cl.[7] ............................................. G11B 21/22
(52) U.S. Cl. .................................................. 360/254.9
(58) Field of Search ........................... 360/254.9, 254.7

(56) References Cited

U.S. PATENT DOCUMENTS

| 5,148,339 | A | * | 9/1992 | Yoshida | ................... | 360/254.7 |
| 5,973,886 | A | | 10/1999 | Khuu | | |
| 6,057,988 | A | * | 5/2000 | Berberich et al. | ....... | 360/254.9 |
| 6,181,528 | B1 | * | 1/2001 | Reinhart et al. | ......... | 360/254.7 |

FOREIGN PATENT DOCUMENTS

JP          10302421 A  *  11/1998   ........... G11B/21/12

* cited by examiner

Primary Examiner—David Davis
(74) Attorney, Agent, or Firm—Won Tae C. Kim, Esq.; Milad G. Shara, Esq.; Alan W. Young, Esq.

(57) ABSTRACT

A disk drive includes a disk drive base and a disk stack, the disk stack comprising a first disk including a first recording surface and a second recording surface. A spindle motor attached to the disk drive base rotates the disk stack about a spindle motor rotation axis. A ramp load engages at least the first and second lift tab of a head stack assembly. The ramp load includes a shaft coupled to the disk drive base, the shaft defining a shaft axis that is parallel to the spindle motor rotation axis. The ramp load also includes a first ramp defining a first lift tab engaging surface for engaging the first lift tab and a first facing surface configured to face the first recording surface of the first disk at a first distance, and a second ramp defining a second lift tab engaging surface for engaging the second lift tab and a second facing surface configured to face the second recording surface of the first disk at a second distance. The first and second ramps may be slid parallel to the shaft to a desired position at which the difference between the first distance and the second distance is minimized. The first and second ramps may then be locked onto the shaft at the desired position.

9 Claims, 4 Drawing Sheets

DISK DRIVE HAVING A VERTICALLY ADJUSTABLE RAMP LOAD

BACKGROUND OF THE INVENTION

1. Field of the Invention

The present invention relates to disk drives. More particularly, the present invention relates to disk drives that include a vertically adjustable ramp load.

2. Description of the Prior Art

Ramp-loading disk drives utilize a ramp to transition a flying head off-of and back-onto a flying area above the surface of the rotating disk. The ramp typically interacts with a lift tab that supports the flying head. The disk is spun-up while the lift tab is on the ramp and the head is not in contact with the disk. Once the disk is rotating at a specified speed, the lift tab is moved down the ramp such that an air bearing is developed between the head and the disk. The head may then move free of the ramp. Before the disk is spun-down, the lift tab is moved onto the ramp such that the head is moved away from the disk.

One method of increasing the storage capacities of disk drives is to store data more densely on each disk. One of the consequences of storing data more densely on a disk, however, is that the heads must be correspondingly decreased in size and must fly closer to the recording surface of the disk. Another method of increasing the storage capacity is to manufacture disk drives with a greater number of stacked platters (individual disks). The later method has led to relatively tall disk stacks including, for example, four or more individual disks, each of which has two recording surfaces. However, it has proven difficult to precisely align each of the ramps relative to the respective recording surfaces of each disk in a tall disk stack. Indeed, the manufacturing tolerances of the disk stack, when summed over each disk of the stack, are such that it becomes difficult to correctly position the ramps so that each of the ramps is precisely positioned at the correct height over the recording surface of its respective disk.

What are needed are ramps that minimize the effects of manufacturing tolerances of the disks of a disk stack. What are needed, therefore, are ramps that minimize the alignment offset between the ramps and the disks.

SUMMARY OF THE INVENTION

Accordingly, this invention may be regarded as a disk drive, comprising a disk drive base; a disk stack, the disk stack comprising a first disk including a first recording surface and a second recording surface; a spindle motor for rotating the disk stack about a spindle motor rotation axis, the spindle motor being attached to the disk drive base; a head stack assembly including a first lift tab and a second lift tab; a ramp load for engaging the first and second lift tabs, the ramp load comprising a shaft coupled to the disk drive base, the shaft defining a shaft axis that is parallel to the spindle motor rotation axis; a first ramp defining a first lift tab engaging surface for engaging the first lift tab and a first facing surface configured to face the first recording surface of the first disk at a first distance, and a second ramp defining a second lift tab engaging surface for engaging the second lift tab and a second facing surface configured to face the second recording surface of the first disk at a second distance, the first and second ramps being configured to be selectively slid in a direction that is parallel to the shaft to a desired position wherein a difference between the first distance and the second distance is minimized and to be locked onto the shaft at the desired position.

The disk drive may further comprise a ramp assembly configured to selectively slide over and lock onto the shaft and wherein the first and second ramps are unitarily formed with the ramp assembly. The first ramp may be integral and unitarily formed with the second ramp to define a ramp pair. The disk drive may include a plurality of ramp pairs, each ramp pair of the plurality of ramp pairs being configured to be selectively and independently slid and locked onto the shaft.

The ramp assembly and the shaft may be shaped so as to enable an interference fit of the ramp assembly to the shaft. Alternatively, the disk drive may further include a ramp assembly fastener that is adapted to fasten and lock the ramp assembly onto the shaft. The ramp assembly may include a shaft-contacting surface that defines a through bore dimensioned to fit over the shaft. The shaft may a unitary extension of the disk drive base. The shaft and the disk drive base may be formed of the same material. The first ramp and the second ramp may include a plastic material. The first and second ramps may include molded plastic and the shaft may include a metal.

The foregoing and other features of the invention are described in detail below and set forth in the appended claims.

DESCRIPTION OF THE PREFERRED EMBODIMENTS

Figure 1:
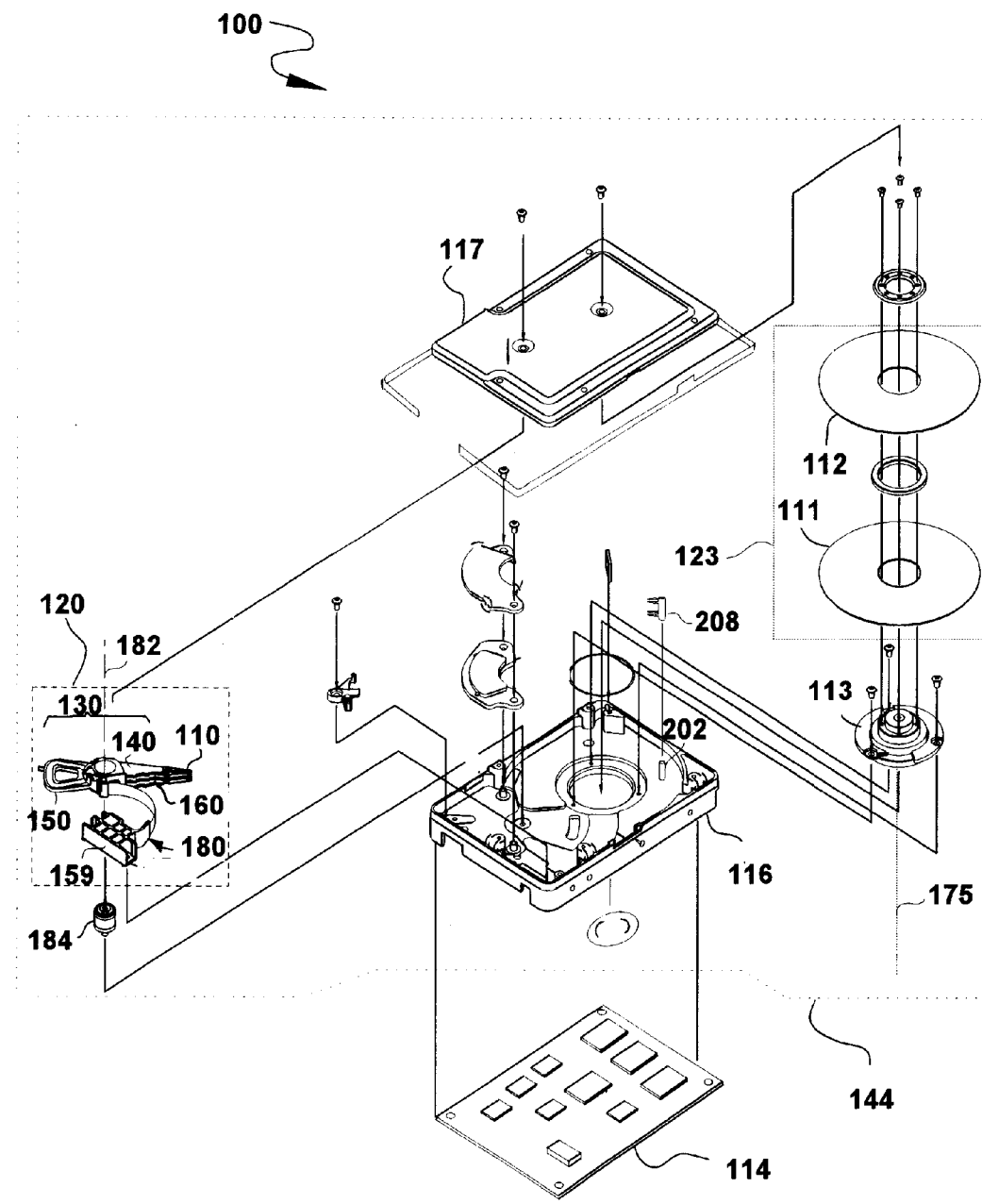
FIG. 1 is an exploded view of a magnetic disk drive according to an embodiment of the present invention.

FIG. 1 shows the principal components of a disk drive such as a magnetic hard disk drive 100 constructed in accordance with this invention. With reference to FIG. 1, the preferred disk drive 100 is an integrated drive electronics (IDE) drive comprising a Head Disk Assembly (HDA) 144 and a Printed Circuit Board Assembly (PCBA) 114.

The HDA 114 includes a base 116 and a cover 117 attached to the base 116 that collectively house a disk stack 123 that includes a plurality of magnetic disks (of which only a first disk 111 and a second disk 112 are shown in FIG. 1), a spindle motor 113 attached to the base 116 for rotating the disk stack 123, a head stack assembly 120, and a pivot bearing cartridge 184 (such as a stainless steel pivot bearing cartridge, for example) that rotatably supports the HSA 120 on the base 116. Preferably, the spindle motor 113 rotates the disk stack 123 at a constant angular velocity about a spindle motor rotation axis 175. The preferred HSA 120 comprises a swing-type or rotary actuator assembly 130, at least one Head Gimbal Assembly HGA) 110, and a flex circuit cable assembly 180. The rotary actuator assembly 130 includes a body portion 140, at least one actuator arm 160 cantilevered from the body portion 140, and a coil portion 150 cantilevered from the body portion 140 in an opposite direction from the actuator arm 160. The actuator arm 160 supports the HGA 110 with a head and a lift tab located at or near its far distal end that is biased toward and moveable over the disks 111, 112. The flex cable assembly 180 includes a flex circuit cable and a flex clamp 159. The HSA 120 is pivotally secured to the base 116 via the pivot bearing cartridge 184 so that the head at the distal end of the HGA 110 may be moved over a recording surface of the disks 111, 112. The pivot bearing cartridge 184 enables the HSA 120 to pivot about a pivot axis, shown in FIG. 1 at reference numeral 182. The storage capacity of the HDA 111 may be increased, as shown in FIG. 1, by including additional disks in the disk stack 123 and by an HSA 120 having a vertical stack of HGAs 110 supported by multiple actuator arms 160. The disk drive 100 also includes a ramp load assembly 208 (or ramp pairs—see FIGS. 3A, 3B and 3C) and a shaft 202, which together form a vertically adjustable ramp load according to the present invention, as discussed in detail with reference to FIGS. 2 and 3.

Figure 2:
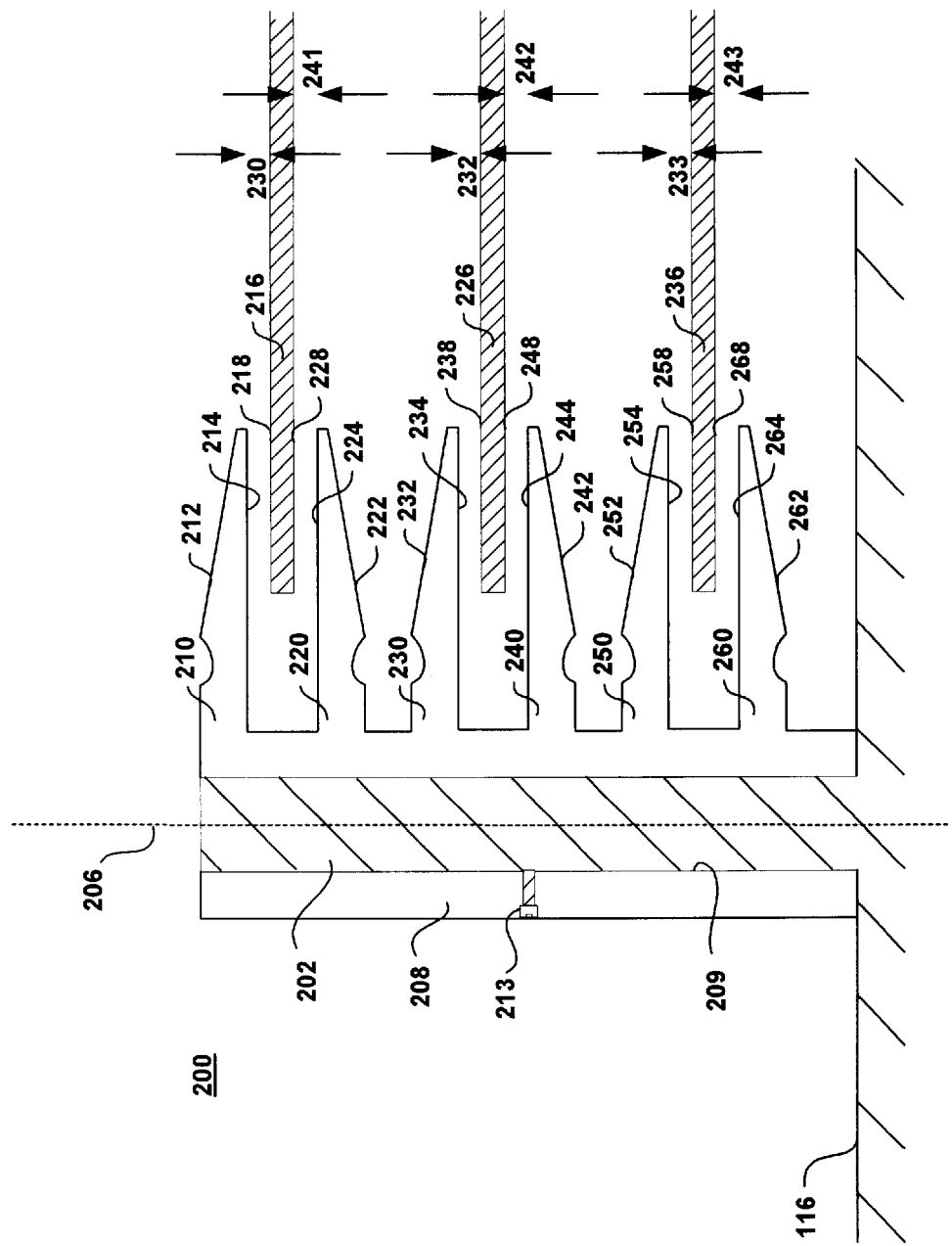
FIG. 2 is a cross-sectional view of a vertically adjustable ramp load, according to an embodiment of the present invention.

FIG. 2 is a cross-sectional view of a vertically adjustable ramp load 200, according to an embodiment of the present invention. According to this embodiment, the vertically adjustable ramp load 200 includes a ramp assembly 208 and a shaft 202. The shaft 202 of the ramp load 200 is coupled to the disk drive base 116 and defines a shaft axis 206 that is parallel to the spindle motor rotation axis 175 (FIG. 1). The shaft 202, for example, may be a unitary extension of the disk drive base 116 ((i.e., the disk drive base 116 and the shaft 202 may be formed as a single unit, free of joints), as shown in FIG. 2 or may be attached to the disk drive base by a fastener, as shown at 375 in FIGS. 3B and 3C. The shaft 202 may, therefore, be formed of the same material as the disk drive base 116. For example, the disk drive base 116 may be formed of or include metal.

According to the embodiment shown in FIG. 2, the ramp assembly 208 is configured to selectively slide over and lock onto the shaft 202. For illustrative purposes only, the vertically adjustable ramp load 200 is shown in combination with three disks: a first disk 216, a second disk 226 and a third disk 236. However, the present invention is applicable to disk drives having a greater or lesser number of disks. As shown, each of the disks 216, 226 and 236 may have two recording surfaces. For example, the first disk 216 may have a first recording surface 218 and a second recording surface 228. Similarly, the second disk may have a first recording surface 238 and a second recording surface 248. The third disk 236 also may have a first recording surface 258 and a second recording surface 268. According to the present invention, the HGA 110 (shown in FIG. 1) includes at least a first and a second lift tab for supporting respective HGAs 110 on the ramp load 200. The ramp load 200 of FIG. 2 includes six ramps, referenced by numerals 210, 220, 230, 240, 250 and 260. For example, the HGA 110 may include six lift tabs, each ramp 210, 220, 230, 240, 250 and 260 of the ramp load.200 being configured to support a corresponding lift tab of the HGA 110.

The ramp assembly 208 may include a first ramp 210 that defines a first lift tab engaging surface 212 for engaging the first lift tab of the HGA 110 and a first facing surface 214 configured to face the first recording surface 218 of the first disk 216 at a first distance, shown at 230 in FIG. 2. Similarly, the second ramp 220 defines a second lift tab engaging surface 222 for engaging the second lift tab of the HGA 110 and a second facing surface 224 configured to face the second recording surface 228 of the first disk 216 at a second distance, shown at 241. Relative to the first disk 216, therefore, the first distance 230 is the distance between the facing surface 214 of the first ramp 210 and the first recording surface 218 of the first disk 216, whereas the second distance 241 is the distance between the facing surface 224 of the second ramp 220 and the second recording surface 228 of the first disk 216. The third ramp 230 defines a third lift tab engaging surface 232 for engaging the third lift tab of the HGA 110 and a third facing surface 234 configured to face the first recording surface 238 of the second disk 226 at a third distance, shown at 232 in FIG. 2. Similarly, the fourth ramp 240 defines a fourth lift tab engaging surface 242 for engaging the fourth lift tab of the HGA 110 and a fourth facing surface 244 configured to face the second recording surface 248 of the second disk 226 at a fourth distance, shown at 242. Turning now to the fifth and sixth ramps 250, 260, the fifth ramp 250 defines a fifth lift tab engaging surface 252 for engaging the fifth lift tab of the HGA 110 and a fifth facing surface 254 configured to face the first recording surface 258 of the third disk 236 at a fifth distance 233. The sixth ramp 260 defines a sixth lift tab engaging surface 262 for engaging the sixth lift tab of the HGA 110 and a sixth facing surface 264 configured to face the second recording surface 258 of the third disk 236 at a sixth distance, shown at 243.

As shown in FIGS. 1 and 2, the ramp assembly 208 is configured to slide on the shaft 202 parallel to the shaft axis 206. Indeed, the ramp assembly 208 defines a surface 209 that forms a through bore dimensioned to snugly fit over the shaft 202 and allow the ramp assembly 208 to slide thereon in a direction that is parallel to the shaft axis 206. In the embodiment shown in FIG. 2, the first and second ramps 210, 220 are unitarily formed with the ramp assembly 208, as are the third through sixth ramps 230, 240, 250 and 260. It is to be noted that although FIG. 2 shows a ramp assembly 208 provided with six ramps 210, 220, 230, 240, 250 and 260 for providing ramp load functionality to three disks 216, 226 and 236 each of which having two recording surfaces, the present invention is readily applicable to ramp assemblies 208 having a greater or lesser number of ramps.

Figure 3A:
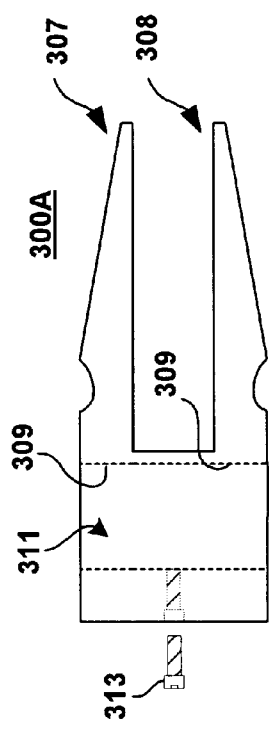
FIG. 3A is a cross sectional view of a ramp pair, according to another embodiment of the present invention.

To align the ramp assembly 208 and its constituent ramps 210, 220, 230, 240, 250 and 260 with the first, second and third disks 216, 226 and 236, the ramps 210, 220, 230, 240, 250 and 260 may be selectively slid over the shaft 202 to a desired position. The desired position of the ramp assembly 208, according to the present invention, is the position in which the differences between 230 and 241, between 232 and 242 and between 233 and 243 are minimized. Ideally, these differences would be zero. However, manufacturing tolerances are such that such an ideal positioning of the ramp assembly 208 relative to the first, second and third disks 216, 226 and 236 may be difficult to achieve. In practice, the ramp assembly 208 may be slid on the shaft 202 to a desired position wherein the expression SQRT $((230–241)^2 + (231–242)^2 + (232–243)^2)$ is minimized, where SQRT ( ) is the square root function. Such desired position of the ramp load 208 relative to the first, second and third disks 216, 226 and 236 maybe measured by machine vision systems, such as disclosed in commonly assigned U.S. Pat. No. 6,052,890, the disclosure of which is hereby incorporated herein by reference in its entirety. When the ramp assembly 208 has been slid to the desired or optimal position, the ramp assembly 208 may be locked into that position. For example, the ramps 210, 220, 230, 240, 250 and 260 may be locked into the desired position by locking the ramp assembly 208 to the shaft 202 by means of a fastener such as shown at reference numeral 213, by means of an interference fit between the ramp assembly 208 and the shaft 202 or by any other means effective to lock the ramp assembly 208 to the shaft 202. FIG. 3A is a cross sectional view of ramp pair 300A according to the present invention. As shown, the ramp pair 300A includes a shaft-contacting surface 309 that defines a through bore 311 dimensioned to snugly fit over the shaft 202 (shown in FIGS. 3B and 3C) and in intimate contact therewith. The ramp pair 300A includes a ramp 307 that is integrally and unitarily formed with another ramp 308. In use, the ramp bore 311 of the ramp pair 300A may be fitted over the shaft 202 and slid along and locked onto the shaft 202 at a desired position, as described below.

Figure 3B:
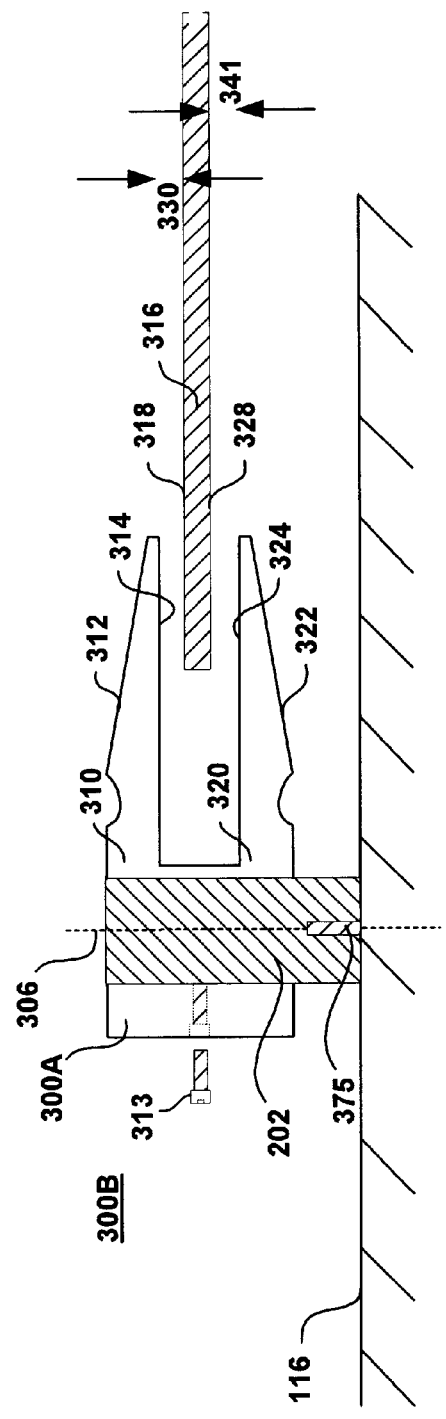
FIG. 3B is a cross sectional view of a vertically adjustable ramp load including a single ramp pair, according to a still further embodiment of the present invention.
Figure 3C:
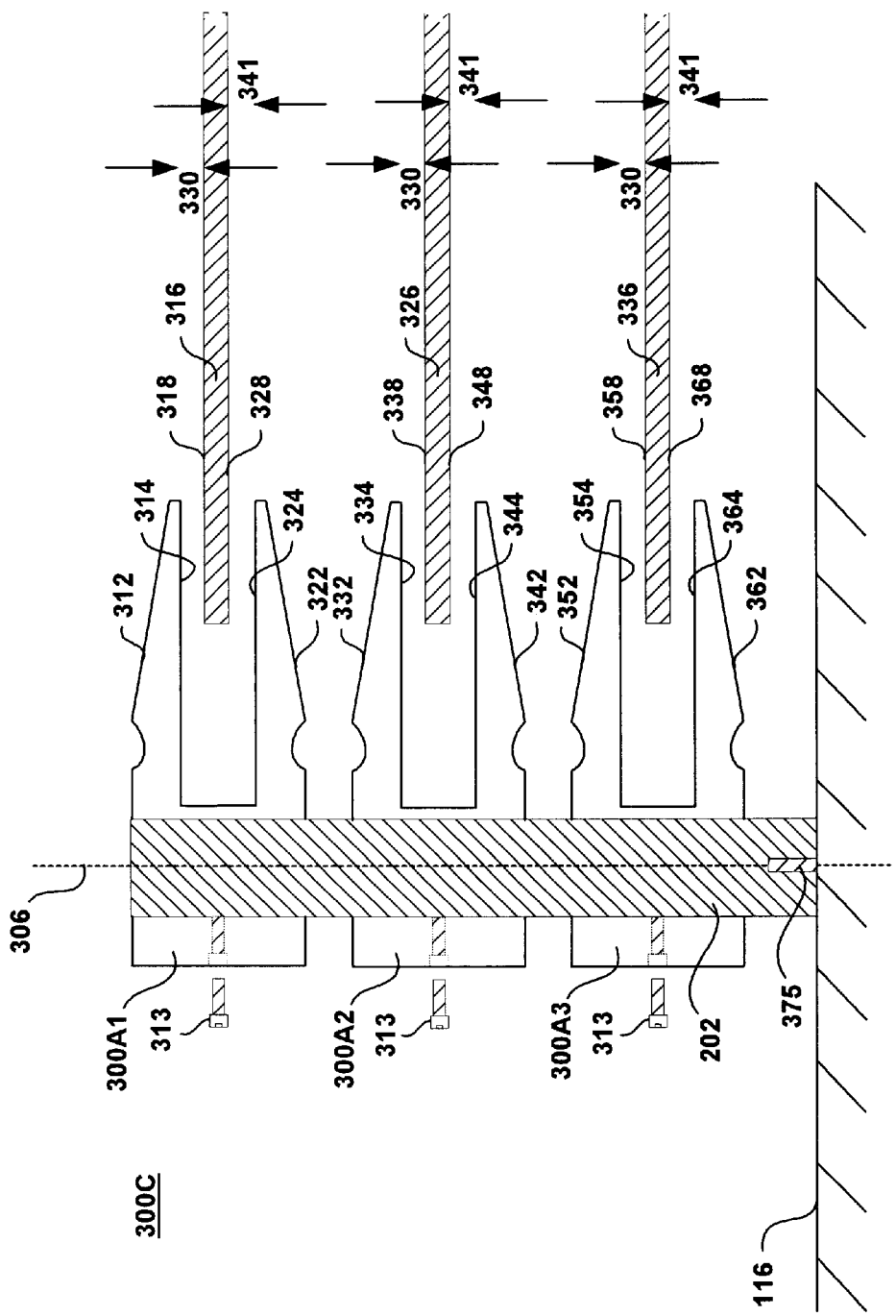
FIG. 3C is a cross sectional view of a vertically adjustable ramp load including three of the ramp pairs shown in FIG. 3A, according to a further embodiment of the present invention.

FIG. 3B is a cross sectional view of a vertically adjustable ramp load 300B, according to another embodiment of the present invention. The ramp load 300B includes a shaft 202. The shaft 202 may be distinct from the drive base 116 and fastened thereto by means of a fastener 375 as shown in FIGS. 3B and 3C or may be unitarily formed with the disk drive base 116, as shown in FIG. 2. Instead of a ramp assembly as shown at 208 in FIG. 2, the embodiment shown in FIG. 3B includes a ramp pair, such as shown at 300A in FIG. 3A. The disk pair 300A is configured to slide along the shaft 202 and lock thereto by means of the fastener 313 or by any other suitable means, such as an interference fit, for example. The ramp load 300B of FIG. 3B includes a single ramp pair 300A, which is suitable for a disk drive that includes a single disk 316. As shown in FIG. 3B, the ramp pair 300A includes a first ramp 310 that defines a first lift tab engaging surface 312 for engaging a first lift tab of the HGA 110 and a first facing surface 314 configured to face a first recording surface 318 of the disk 316 at a first distance, shown at 330. Similarly, the second ramp 320 defines a second lift tab engaging surface 322 for engaging a second lift tab of the HGA 110 and a second facing surface 324 configured to face a second recording surface 328 of the disk 316 at a second distance 341. To align the ramp pair 300A with the disk 316, the ramp pair 300A may be selectively slid over the shaft 202 to a desired position. The desired position, according to the present invention, is the position in which the first distance 330 between the first facing surface 314 and the first recording surface 318 of the disk 316 is equal or substantially equal to the second distance 341 between the second facing surface 324 and the second recording surface 328 of the disk 316. Once the ramp pair 300A has been positioned at the desired position on the shaft 202, the ramp pair 300A may be locked or otherwise secured thereto, by means of fastener 313 (such as a screw, for example) or by any other suitable means known to those of skill in this art.

In the embodiment shown in FIG. 3C, a three-disk disk stack 123 is shown (for illustrative purposes only) and the ramp load 300C correspondingly includes three ramp pairs; namely, a first ramp pair 300A1, a second ramp pair 300A2 and a third ramp pair 300A3, each ramp pair providing ramp load functionality for each of the two recording surfaces of each of the disks 316, 326 and 336. Each of the ramp pairs 300A1, 300A2 and 300A3 may have the same structure as ramp pair 300A shown in FIG. 3A.

As shown in FIG. 3C, the first ramp pair 300A1 defines a first lift tab engaging surface 312 for engaging the first lift tab of the HGA 110 and a first facing surface 314 configured to face the first recording surface 318 of the first disk 316 at a first distance 330. The first ramp pair 300A also defines a second lift tab engaging surface 322 for engaging the second lift tab of the HGA 110 and a second facing surface 324 configured to face the second recording surface 328 of the first disk 316 at a second distance 341. Likewise, the second ramp pair 300A2 defines a third lift tab engaging surface 332 for engaging the third lift tab of the HGA 110 and a third facing surface 334 configured to face the first recording surface 338 of the second disk 326 at a first distance 330. The second ramp pair 300A2 also defines a fourth lift tab engaging surface 342 for engaging the fourth lift tab of the HGA 110 and a fourth facing surface 344 configured to face the second recording surface 348 of the second disk 326 at a second distance 341. Similarly, the third ramp pair 300A3 defines a fifth lift tab engaging surface 352 for engaging the fifth lift tab of the HGA 110 and a fifth facing surface 354 configured to face the first recording surface 358 of the third disk 336 at a first distance 330. The second ramp pair 300A3 also defines a sixth lift tab engaging surface 362 for engaging the sixth lift tab of the HGA 110 and a sixth facing surface 364 configured to face the second recording surface 368 of the third disk 336 at a second distance 341. It is to be noted that the ramp load 300C may include a greater or lesser number of ramp pairs, depending upon the number of disks in the disk stack 123 of the drive 100. According to the present invention, the first, second and third ramp pairs 300A1, 300A2 and 300A3 may be independently slid along the shaft 202 (parallel to the shaft axis 306) to respective desired positions. The desired position, for each of the ramp pairs 300A1, 300A2 and 300A3 is that position at which the first distance 330 is equal (or substantially equal) to the second distance 341.

The shaft 202 and the disk drive base 116 may be formed of or include a same material. For example, the shaft 202 may include a metal, whereas the ramp assembly 208 or the individual ramps 310, 320, 330, 340, 350 and 360 may include a plastic material formed by any suitable process, such as molding. Alternatively, the ramp assembly 208 and its constituent ramps 210, 220, 230, 240, 250 and 260 or the individual ramps 310, 320, 330, 340, 350 and 360 and the shaft 202 may be formed of a same material, such as plastic or metal.

What is claimed is:

1. A disk drive, comprising:
   a disk drive base;
   a disk stack, the disk stack comprising a plurality of disks, each of the plurality of disks including a first recording surface and a second recording surface;
   a spindle motor for rotating the disk stack about a spindle motor rotation axis, the spindle motor being attached to the disk drive base;
   a head stack assembly including a first lift tab and a second lift tab;
   a ramp load for engaging the first and second lift tabs, the ramp load comprising:
      a shaft coupled to the disk drive base, the shaft defining a shaft axis that is parallel to the spindle motor rotation axis,
      a plurality of independently slideable ramp pairs, each ramp pair being associated with a selected one of the plurality of disks and each ramp pair including a surface defining a through bore that is dimensioned to fit around the shaft to enable the ramp pair to independently slide along the shaft in a direction that is parallel to the shaft axis, each ramp pair including:
         a first ramp defining a first lift tab engaging surface for engaging the first lift tab and a first facing surface configured to face the first recording surface of the selected disk at a first distance.

2. The disk drive of claim 1, further comprising a ramp assembly configured to selectively slide over and lock onto the shaft and wherein the first and second ramps are unitarily formed with the ramp assembly.

3. The disk drive of claim 2, wherein the ramp assembly and the shaft are shaped so as to enable an interference fit of the ramp assembly to the shaft.

4. The disk drive of claim 2, further including a ramp assembly fastener that is adapted to fasten and lock the ramp assembly onto the shaft.

5. The disk drive of claim 2, wherein the ramp assembly includes a shaft-contacting surface that defines a through bore dimensioned to fit over the shaft.

6. The disk drive of claim 1, wherein the shaft is a unitary extension of the disk drive base.

7. The disk drive of claim 1, wherein the shaft and the disk drive base are formed of a same material.

8. The disk drive of claim 1, wherein the first ramp and the second ramp include a plastic material.

9. The disk drive of claim 1, wherein the first and second ramps include molded plastic and wherein the shaft includes a metal.

* * * * *